United States Patent [19]

Becker et al.

[11] Patent Number: 4,745,176

[45] Date of Patent: May 17, 1988

[54] CATALYTIC PROCESS FOR PREPARING POLYCUMYLENE FROM α-CUMYL HALIDE

[75] Inventors: Robert Becker, Leverkusen; Ludwig Bottenbruch, Krefeld; Johann Grolig; Helmut Waldmann, both of Leverkusen, all of Fed. Rep. of Germany

[73] Assignee: Bayer Aktiengesellschaft, Leverkusen, Fed. Rep. of Germany

[21] Appl. No.: 678,167

[22] Filed: Dec. 4, 1984

[30] Foreign Application Priority Data

Dec. 15, 1983 [DE] Fed. Rep. of Germany ....... 3345446

[51] Int. Cl.[4] ............................................ C08G 61/02
[52] U.S. Cl. .................................................... 528/397
[58] Field of Search ......................................... 528/397

[56] References Cited

U.S. PATENT DOCUMENTS

| | | | |
|---|---|---|---|
| 3,346,514 | 10/1967 | Isaacson et al. | 528/397 |
| 3,418,259 | 12/1968 | Kennedy et al. | 528/397 |
| 3,770,661 | 11/1973 | Fritz | 260/2 |
| 4,259,475 | 3/1981 | Johnson et al. | 528/397 |
| 4,335,235 | 6/1982 | Chandler et al. | 528/397 |

*Primary Examiner*—Harold D. Anderson
*Attorney, Agent, or Firm*—Connolly & Hutz

[57] ABSTRACT

Polycumylene of a relatively high degree of polymerization is obtained in a reasonable space-time yield by Friedel-Crafts alkylation of α-cumyl halide when catalyst composition, catalyst concentration and dilution ratio are selected within certain limits.

6 Claims, No Drawings

CATALYTIC PROCESS FOR PREPARING POLYCUMYLENE FROM α-CUMYL HALIDE

The invention relates to a process for preparing polycumylene from cumyl halide by Friedel-Crafts alkylation.

Polycumylenes of the $(-C_6H_4-C(CH_3)_2-)_n$ type are known. They are prepared by Friedel-Crafts either from benzene and costly p-bis-(2-chloroisopropyl)-benzene (U.S. Pat. No. 3,770,661) or from cumyl halide, the latter option only leading to degrees of polycondensation of $n=10$ to 30 (cf. CHEMTECH (1972) 687).

It has now been found, surprisingly, that polycumylene having degrees of polycondensation of more than 30 can be obtained from cumyl halide—and that in reasonable space-time yields—by selecting for the Friedel-Crafts alkylation a catalyst composition, the catalyst concentration and the dilution ratio within narrow limits.

The invention accordingly provides a process for preparing polycumylene from α-cumyl halide using the Friedel-Crafts method, characterised in that cumyl halide and, relative to 100 parts by weight of cumyl halide, 1 to 50, preferably 2 to 20, parts by weight of catalyst mixture comprising (a) aluminium halide and
(b) as the second Lewis acid, a halide from the series comprising
  (i) halides of 1- to 3-valent transition metals except for those of subgroups 3, 4 and 5,
  (ii) halides of Tl(III), Sn(II), Pb(II), Sb(III) and Bi(III),
  (iii) boron trihalides and
  (iv) P(V) halides, where the molar ratio a/b is 1:10 to 4:1, preferably 1:5 to 3:1, are reacted at temperatures of $-130°$ to $+30°$ C., preferably $-50°$ to $+10°$ C., in 100 to 5,000, preferably 300 to 3,000, parts by weight of inert organic solvent.

Aluminium halides (a) are aluminium compounds which contain at least one aluminium-halide bond per molecule. Preferred aluminium halides include aluminium trichloride, tribromide and triiodide, aluminium-$C_1$-$C_4$-alkyl halides of the $(RAlHal_2)_n$ and $(R_2AlHal)_n$ type where Hal=chlorine, bromine or iodine and $n=1$ or 2, complexes of the $(AlHal_4)_2Me$ type where Me=divalent metal ion, such as, for example, $Co^{2+}$, and aluminium halides which are obtained in situ from aluminium trihalides by replacing one or two halogen atoms by other nucleophiles, such as, for example, $C_1$-$C_3$-alcoholates or acid anions, such as, for example, hydrogenphosphate. If the aluminium atom is bonded to more than one halogen atom, they can also be mixed; for example, some of the chlorine atoms can be replaced by bromine or iodine atoms. Preferred aluminium halides (a) can also contain water of crystallisation, but hydrates having hydrated aluminium ions (coordination number at least 6) are ruled out. Instead of using aluminium halides (a) it is also possible to use compounds from which the aluminium halides are formed before or during the reaction.

As to halides (b), they, like halides (a), can contain different halogens and/or water of crystallisation, their halogen atoms can be partly replaced by other nucleophiles, and they can be formed from other compounds before or during the reaction.

Examples of preferred halides (b) are:

(i) copper(II), zinc, chromium(III), iron(II), iron(III), cobalt and nickel halides, in particular iron(III) chloride,
(ii) thallium(III) chloride, tin(II) chloride, lead(II) chloride, antimony trichloride and bismuth trichloride,
(iii) boron trichloride,
(iv) phosphorus pentachloride and phosphorus oxytrichloride.

The inert solvent can be any solvent whose melting point is sufficiently low for the entire reaction mixture to be liquid at the respective reaction temperature. The inert solvent is preferably a halogenated, preferably chlorinated, hydrocarbon, such as, for example, monochloromethane, dichloromethane, trichloromethane, tetrachloromethane, monochloroethane, 1,1- and 1,2-dichloroethane, trichloroethane, 1,1,2,2-tetrachloroethane, monochloroethylene, 1,1- and 1,2-dichloroethylene, trichloroethylene or tetrachloroethylene. Examples of preferred fluorine-, bromine- or iodine-containing solvents are monobromomonochloromethane, bromochlorofluoromethane, monofluorodichloromethane, methyl iodide, bromoethane, 1-chloro-2bromoethylene, 1,1-dibromoethane, 1,1-dichloro-1,2-dibromoethane, 1,2-dichloro-1,2-dibromoethane, 1,1-dichloro-1,2,2,2-tetrafluoroethane, monoiodoethane, 1,1,2-tribromoethane, 1,1,2-trichloro-1,2,2-trifluoroethane and 1,2dibromoethylene. Dichloromethene and mixtures of dichloromethane and trichloroethylene are preferably used.

In a version of the process according to the invention, the reaction can be carried out in the presence of weak to medium strong Lewis bases ($pK_b$ $+4-+13$) which can form complexes with the metal ions of halide (a) and/or (b) via oxygen atoms in order to make the halides more soluble. The amount of the Lewis bases is chosen in such a way that at least one metal-halide bond is retained per molecule. Preferred examples of such Lewis bases are borate, silicate, phosphate, sulphate and perchlorate radicals, but also arsenates, vanadates, niobates, tantalates and titanates. The Lewis bases are particularly preferably the acid radicals of orthophosphoric acid and the reaction products of phosphorus pentoxide with the trace amounts of water present in the inert solvents, i.e. a wide variety of different products, but usually polyphosphates. Phosphorus pentoxide is preferably added in amounts of 0.001 to 1.0% by weight, relative to the total reaction mixture, leading to the formation of complexing phosphates whose concentration, however, is never so high as to cleave all metal-halide bonds.

A further component which may be added is hydrogen halide, preferably the hydrogen halide corresponding to the halogen of the cumyl halide used. The hydrogen halide can be added before the start of the reaction; it is in any case formed in the course of the process, as the product of an elimination reaction. As an excessively high concentration would impair the formation of relatively high molecular weight polycumylenes, care should be taken to ensure that the concentration of hydrogen halide does not exceed 0.1 mole, preferably 0.02 mole, per 100 g of reaction mixture. For this purpose, it is possible, for example, to carry out the reaction under reduced pressure or to blow an inert gas stream through the reaction mixture.

The process according to the invention can be carried out under superatmospheric pressure, reduced pressure or—preferably—under atmospheric pressure. For example, a suspension of the inorganic halides and any other additives can be put into the empty reaction vessel in a portion of the inert solvent with stirring and under nitrogen, and a solution of the cumyl halide in the remainder of the inert solvent can be added dropwise, the desired temperature being maintained by external cooling if desired. After all the cumyl halide has been added the reaction mixture can be stirred for a further period and the hydrogen halide formed can be removed by means of inert gas. To destroy the catalyst system the reaction mixture can be poured into water or into ice and the first insoluble polymer fraction be filtered off. The second fraction can be precipitated from the organic phase by adding acetone to it. The mother liquor finally yields the fraction of the lowest molecular weight on concentrating it and treating it with methanol.

The polycumylenes prepared according to the invention can contain, as terminal groups, the cumyl groups produced by the Friedel-Crafts alkylation on the one hand and the chloroisopropylphenyl or, after hydrolysis, hydroxyisopropylphenyl groups produced on the other. Further possible terminal groups are halogen and OR′, where R′ denotes $C_1$-$C_{18}$-alkyl (in particular methyl), $C_7$-$C_{12}$-aralkyl (preferably benzyl) and $C_6$-$C_{18}$-aryl, preferably $C_6$-$C_{10}$-aryl (in particular phenyl). However, side reactions can also lead to the formation of, for example, isopropenylphenyl groups or trimethylphenylindyl groups of the formula

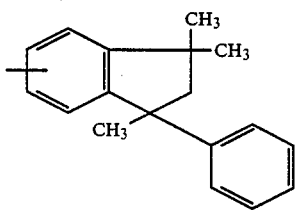

The polycumylenes prepared according to the invention preferably have weight average molecular weights $M_w$ of above 5,000 and melting points of above 270° C. They can also be branched as a result of multiple alkylation on the phenyl ring, so that up to 30% of all phenyl rings can be branching points.

EXAMPLE 1

78 g of α-cumyl chloride dissolved in 200 ml of methylene chloride were added dropwise at a temperature of −10° C. with stirring and nitrogen input to a mixture of 300 ml of dried methylene chloride, 1 g of anhydrous aluminium trichloride and 1 g of anhydrous iron trichloride in the course of 60 minutes, and the mixture was then stirred at −10° C. for 3 hours.

The entire reaction material was then warmed to room temperature and stirred into 2 litres of distilled water. The precipitate was then filtered off (22.9 g), and the filter cake was washed with 150 ml of methylene chloride. This gave 16.1 g (22% of theory relative to converted α-cumyl chloride) of a residue which was insoluble in methylene chloride and whose melting range was around 280° C. After a fraction of about 2 g had been separated off with boiling tetrahydrofuran, the average molecular weight of this fraction being about 1,400, the material left behind was a crystalline polycondensate which had an Mw of 5,500 and an Mn of 4,000 (measured by gel permeation chromatography at 140° C. in trichlorobenzene). The melting range of the product was 248°-284° C. The organic phase of the filtrate, combined with the 150 ml of methylene chloride used for washing the filter cake, was added dropwise to 2 litres of methanol. This produced a precipitate of 25 g of a short-chain cumylene oligomer melting at around 150° C.

EXAMPLE 2

183 g of α-methylstyrene were dissolved in 600 ml of methylene chloride and were converted at −10° C. to −12° C. with dried hydrogen chloride into α-cumyl chloride.

This solution was added a little at a time at −40° C. to a mixture of 3 g of anhydrous aluminium trichloride, 12 g of anhydrous iron chloride, 0.5 g of phosphorus pentoxide and a further 1,800 ml of methylene chloride in the course of an hour, and the resulting mixture was then stirred at −40° C. for a further 4 hours.

To terminate the reaction the reaction mixture was poured into 6 litres of water at room temperature.

The organic phase was separated off, was reduced to a quarter of its volume and was suspended in twice the amount by weight of acetone. A colourless solid (polycumylene $P_1$) was filtered off (melting range 210°-230° C.; $M_w$ 2,350; $M_n$ 1,590; yield 38%). Furthermore, a polycumylene $P_2$ having a melting range from 78° to 110° C., an $M_w$ of 1,350 and an $M_n$ of 1,000 was obtained in 47% yield as the precipitate on pouring the concentrated mother liquor to which methylene chloride had been added into excess methanol.

If $P_1$ is dissolved in about 500 ml of boiling chlorobenzene and the solution is cooled down to room temperature, this produces in a 26% yield (relative to $P_1$) a polycumylene having the melting range 245°-255° C. ($M_w$ 2,010; $M_n$ 1,510). Left behind in the liquid phase, in the form of a solution, is polycumylene ($P_3$) which, on precipitation in excess methanol, has a melting range from 190° to 215° C., an $M_w$ of 2,650 and an $M_n$ of 1,610 (yield 53%, relative to starting polycumylene $P_1$). $P_3$ can be split by preparative gel chromatography at room temperature in chlorobenzene into roughly equal portions of a polycumylene with $M_w=4,200$ and $M_n=2,650$ (melting range 180°-195° C.) and a polycumylene of $M_w=2,400$ and $M_n=1,700$ (melting range 170°-180° C.).

EXAMPLE 3

3 g of aluminium chloride, 6 g of iron trichloride and 30 g of phosphorus pentoxide were used at −10° C. in the manner of Example 2. The result was, in addition to 105.8 g of lower molecular weight oligocumylenes, 67.4 g of a polycumylene ($P_1$) having a melting range at around 270° C. ($M_w=2,940$, $M_n=1,780$). Treatment at 40° C. with chlorobenzene and removal of the insoluble matter by filtration produces on precipitation in methanol a polycumylene with $M_w=2,100$ and $M_n=1,700$ (melting range around 240° C.) in a yield of 40% (relative to $P_1$); treatment of the residue at 65° C. with chlorobenzene and filtering off from the insoluble matter produces on precipitation in methanol a polycumylene with $M_w=2,600$ and $M_n=2,100$ (melting range around 270° C.) in a yield of 25%. The residue obtained in the last stage (in a yield of 23%, relative to $P_1$) has the following values:

$M_w=4,500$, $M_n=3,400$ melting range: about 300° C.-315° C.

EXAMPLE 4

183 g of α-methylstyrene were dissolved in 600 ml of methylene chloride and were then converted at −10° C. to −12° C. with dried hydrogen chloride into cumyl chloride.

This solution was added a little at a time to a mixture of 6 g of anhydrous aluminium trichloride and 3 g of anhydrous iron trichloride in a further 1,800 ml of methylene chloride in the course of an hour, and the reaction mixture was stirred at −10°C. for 4 hours. 6 litres of water were then added at room temperature to the entire reaction mixture. The solvent was distilled out of the organic phase, and the residue was washed with 1.2 litres of acetone, was then filtered off and was dried at 50° C.; this gave 72.5 g of a colourless solid (R1) having the melting range of 268°-276° C. Fractional precipitation on treatment at 40° C.-100° C. with chlorobenzene produced:

| Input product | Yield (%) of precipitation product | $M_w$ | $M_n$ | Melting range about (°C.) | Designation |
|---|---|---|---|---|---|
| R1 ⟶ | 73% | 2700 | 2030 | 270 | R2 |
| R2 ⟶ | 12% | 3200 | 2350 | 290 | R3 |
|  | 68% | 2800 | 2100 | 275 | R4 |
|  | 14% | 2550 | 2000 | 265 | R5 |
| R3 ⟶ | 20% | 6300 | 5350 | 310 | R6 |
| R4 ⟶ | 35% | 5900 | 5000 | 305 | R7 |

EXAMPLE 5

183 g of α-methyl styrene, dissolved in 600 ml of methylene chloride, were reacted with hydrogen chloride at a temperature of from −12 to −10° C. to yield α-cumyl chloride. The resulting solution was added dropwise at a temperature of −10° C. to a mixture of 3 g of anhydrous aluminum trichloride, 12 g of anhydrous iron trichloride, 0.5 g of phosphorus pentoxide and 1800 ml of methylene chloride in the course of 60 minutes, and the mixture was then stirred at −10° C. for a further 4 hours. To terminate the reaction, the reaction mixture was poured into 6 liters of water at room temperature.

The organic phase was separated off, was reduced to a quarter of its volume and was suspended in twice the amount by weight of acetone. A colourless solid (polycumylene P 1) was filtered off (melting range 300°-320° C.; $M_w$9700; $M_n$2000; yield 46%). Furthermore, a polycumylene P 2 having a melting range of from 110° to 190° C. an $M_w$ of 3000 and an $M_n$ of 2000 was obtained in 47% yield as the precipitate on pouring the concentrated mother liquor, to which methylene chloride had been added, into excess methanol.

If P 1 is recrystallized from 500 ml of chlorobenzene, a polycumylene having a melting range of from 320° to 330° C., an $M_w$ of 32000 and an $M_n$ of 15000 is obtained in 15% yield, relative to P 1. Left behind in the liquid phase, in the form of a solution, is polycumylene P 3 which, on precipitation in excess methanol, has a melting range of about 250° C., an $M_w$ of 3650 and an $M_n$ of 2600 (yield 53%, relative to starting polycumylene P 1).

We claim:

1. A process for preparing polycumylene from α-cumyl halide by Friedel-Crafts alkylation which comprises reacting cumyl halide and, relative to 100 parts by weight of cumyl halide, 1 to 50 parts by weight of a catalyst mixture comprising
   (a) aluminum trichloride and
   (b) at least one halide selected from the group consisting of copper (II) halides, zinc halides, chromium (III) halides, iron (II) halides, iron (III) halides, cobalt halides, and nickel halides,
wherein the molar ratio of component (a) to component (b) is from 1:10 to 4:1, and the reaction is at a temperature of from −50° C. to 10° C., in from 100 to 5,000 parts by weight of inert organic solvent.

2. A process according to claim 1, characterized in that from 2 to 20 parts by weight of the catalyst mixture of (a) and (b) are used relative to 100 parts by weight of cumyl halide.

3. A process according to claim 1 or 2, characterised in that the molar ratio of component (a) to component (b) is from 1:5 to 3:1.

4. A process according to claim 1 or 2 characterised in that from 300 to 3,000 parts by weight of inert organic solvent are used relative to 100 parts by weight of cumyl halide.

5. A process according to claim 1 or 2, characterized in that the inert organic solvent is halogenated hydrocarbons.

6. A process according to claim 1 or 2, characterized in that the reaction is carried out in the presence of a Lewis base of $pK_b$ of from +4 to +13 that can form a complex with the metal ion of (a) or (b) via oxygen atoms, the amount of the Lewis base being such that at least one metal-halide bond is retained per molecule of the halide.

* * * * *